United States Patent
Park et al.

(10) Patent No.: US 9,606,392 B2
(45) Date of Patent: Mar. 28, 2017

(54) DISPLAY PANEL AND LIQUID CRYSTAL DISPLAY INCLUDING THE SAME

(71) Applicant: Samsung Display Co., Ltd., Yongin, Gyeonggi-Do (KR)

(72) Inventors: Sung Kyun Park, Seoul (KR); Jung-Soo Lee, Seoul (KR); Jeong Min Park, Seoul (KR); You Young Jin, Suwon-si (KR); Ji-Hyun Kim, Seoul (KR); Jun Chun, Cheongju-si (KR); Jin Ho Ju, Seoul (KR)

(73) Assignee: SAMSUNG DISPLAY CO., LTD., Gyeonngi-Do (KR)

( * ) Notice: Subject to any disclaimer, the term of this patent is extended or adjusted under 35 U.S.C. 154(b) by 206 days.

(21) Appl. No.: 13/893,491

(22) Filed: May 14, 2013

(65) Prior Publication Data

US 2014/0184972 A1    Jul. 3, 2014

(30) Foreign Application Priority Data

Jan. 3, 2013    (KR) .................. 10-2013-0000768

(51) Int. Cl.
G02F 1/1335 (2006.01)
(52) U.S. Cl.
CPC .............. *G02F 1/133514* (2013.01); *G02F 2001/133519* (2013.01); *G02F 2201/52* (2013.01)
(58) Field of Classification Search
CPC ................................. G02F 1/133514
USPC ........................................ 349/106
See application file for complete search history.

(56) References Cited

U.S. PATENT DOCUMENTS

| | | | | |
|---|---|---|---|---|
| 5,642,176 | A | * | 6/1997 | Abukawa .......... G02F 1/133514 349/106 |
| 7,310,124 | B2 | | 12/2007 | Tsubata et al. |
| 7,599,035 | B2 | | 10/2009 | Park et al. |
| 7,667,796 | B2 | | 2/2010 | Hasei et al. |
| 7,785,504 | B2 | | 8/2010 | Chae et al. |
| 8,107,039 | B2 | | 1/2012 | Kim et al. |
| 2005/0122445 | A1 | * | 6/2005 | Park et al. ............. 349/106 |
| 2006/0061711 | A1 | | 3/2006 | Lee et al. |
| 2008/0063954 | A1 | * | 3/2008 | Song .................. 430/7 |
| 2009/0303424 | A1 | * | 12/2009 | Lee et al. .............. 349/122 |
| 2010/0156874 | A1 | * | 6/2010 | Jung et al. ............. 345/211 |
| 2010/0182549 | A1 | * | 7/2010 | Miyashita ............. 349/106 |
| 2010/0321283 | A1 | * | 12/2010 | Mizuno et al. ........... 345/88 |
| 2011/0155908 | A1 | | 6/2011 | Song et al. |

FOREIGN PATENT DOCUMENTS

| | | |
|---|---|---|
| JP | 2005025003 A | 1/2005 |
| JP | 2007206230 A | 8/2007 |
| JP | 2008209582 A | 9/2008 |

(Continued)

*Primary Examiner* — Paisley L Arendt
*Assistant Examiner* — Edmond Lau
(74) *Attorney, Agent, or Firm* — Cantor Colburn LLP (57) ABSTRACT

A display panel includes: a substrate including red, green, blue and white sub-pixel areas; red, green and blue color filter layers respectively in the red, green and blue sub-pixel areas; and a dummy color filter layer in the white sub-pixel area. The dummy color filter layer is adjacent to at least one of the red color filter layer, the green color filter layer, and the blue color filter layer, and the dummy color filter layer forms a step with the adjacent color filter layer.

19 Claims, 10 Drawing Sheets

(56) References Cited

FOREIGN PATENT DOCUMENTS

| | | | |
|---|---|---|---|
| JP | 2011123092 A | | 6/2011 |
| KR | 1020050064176 A | | 6/2005 |
| KR | 100589785 | | 6/2006 |
| KR | 20090085353 A | * | 8/2009 |
| KR | 1020090085353 A | | 8/2009 |
| KR | 1020100077979 A | | 7/2010 |
| KR | 1020120025173 A | | 3/2012 |
| KR | 1020120039874 A | | 4/2012 |
| KR | 1020120066323 A | | 6/2012 |

* cited by examiner

DISPLAY PANEL AND LIQUID CRYSTAL DISPLAY INCLUDING THE SAME

This application claims priority to Korean Patent Application No. 10-2013-0000768 filed on Jan. 3, 2013, and all the benefits accruing therefrom under 35 U.S.C. §119, the entire contents of which are incorporated herein by reference.

BACKGROUND (a) Field

The invention relates to a display panel, and a liquid crystal display including the same.

(b) Description of the Related Art

Display devices include a plasma display device, a liquid crystal display ("LCD"), an organic light emitting device, etc. Display devices are used for various electronic devices such as monitors, television sets, indoor and outdoor signboards, etc. Display devices used for the television sets and the signboards are required to have high luminance. The LCD, which is a non-emissive display device, has one main disadvantage of low luminance.

The LCD includes two panels provided with field-generating electrodes such as pixel electrodes and a common electrode, and a liquid crystal ("LC") layer with dielectric anisotropy disposed between the panels. If a voltage difference between two electrodes is changed, intensity of an electric field generated by the two electrodes is changed such that transmittance of a light passing through the liquid crystal layer is changed. Accordingly, the voltage difference between the two electrodes is controlled to thereby display a desired image.

A LC panel of the LCD includes a plurality of pixels having a pixel electrode and color filters of red (R), green (G) and blue (B). Each pixel is driven by a signal applied through a display signal line to perform a display operation. The signal line includes a gate line transmitting a scanning signal and a data line transmitting a data signal. The each pixel includes a thin film transistor connected to the gate line and the data line and controlling a data signal transmitted to the pixel electrode.

SUMMARY

The invention provides a display panel having a uniform cell gap in a pixel area, and a liquid crystal display including the same.

A display panel according to an exemplary embodiment of the invention includes: a substrate including red, green, blue and white sub-pixel areas; red, green and blue color filter layers respectively in the red, green and blue sub-pixel areas; and a dummy color filter layer in the white sub-pixel area. The dummy color filter layer is adjacent to at least one of the red color filter layer, the green color filter layer and the blue color filter layer, and the dummy color filter layer forms a step with the adjacent color filter layer.

The dummy color filter layer may include a dummy red color filter layer, a dummy green color filter layer and a dummy blue color filter layer. The dummy red color filter layer, the dummy green color filter layer and the dummy blue color filter layer may have the same area in the white sub-pixel area.

The display panel may further include an overcoat layer covering the red color filter layer, the green color filter layer, the blue color filter layer and the dummy color filter layer.

The color filter layers adjacent to each other among the red color filter layer, the green color filter layer and the blue color filter layer may be overlapped with each other.

A thickness of the dummy color filter layer may be from about 0.2 micrometer (μm) to about 2 micrometers (μm).

The display panel may further include an overcoat layer covering the red color filter layer, the green color filter layer, the blue color filter layer and the dummy color filter layer. The overcoat layer may include an inorganic insulating layer.

A display panel according to another exemplary embodiment of the invention includes: a substrate including red, green, blue and white sub-pixel areas; red, green and blue color filter layers respectively in the red, green and blue sub-pixel areas; and a dummy color filter layer in the white sub-pixel area and including a dummy red color filter layer, a dummy green color filter layer and a dummy blue color filter layer. An open portion is respectively defined between the dummy red color filter layer, the dummy green color filter layer and the dummy blue color filter layer.

The dummy red color filter layer, the dummy green color filter layer and the dummy blue color filter layer may be uniformly distributed in the white sub-pixel area.

A thickness of the dummy color filter layer may be the same as a thickness of the red color filter layer, the green color filter layer and the blue color filter layer.

The display panel may further include an overcoat layer covering the red color filter layer, the green color filter layer, the blue color filter layer and the dummy color filter layer.

The color filter layers adjacent to each other among the red color filter layer, the green color filter layer and the blue color filter layer may be overlapped with each other.

An interval between the dummy red color filter layer, the dummy green color filter layer, and the dummy blue color filter layer may be less than 10 μm.

A liquid crystal display according to an exemplary embodiment of the invention includes: a lower substrate including red, green, blue and white sub-pixel areas; a thin film transistor positioned on the lower substrate; red, green and blue color filter layers corresponding to the red, green and blue sub-pixel areas while covering the thin film transistor; and a dummy color filter layer corresponding to the white sub-pixel area. The dummy color filter layer is adjacent to at least one of the red color filter layer, the green color filter layer and the blue color filter layer, and the dummy color filter layer forms a step with the adjacent color filter layer.

The dummy color filter layer may include a dummy red color filter layer, a dummy green color filter layer and a dummy blue color filter layer. The dummy red color filter layer, the dummy green color filter layer and the dummy blue color filter layer may have the same area in the white sub-pixel area.

The liquid crystal display may further include a planarizing layer covering the red color filter layer, the green color filter layer, the blue color filter layer and the dummy color filter layer.

The planarizing layer may include a photosensitive organic material.

A thickness of the planarizing layer corresponding to the dummy color filter layer may be greater than a thickness of the planarizing layer corresponding to color filter layers of red, green and blue.

A pixel electrode positioned on the planarizing layer may be further included.

The liquid crystal display may further include: an upper substrate facing the lower substrate; a light blocking member positioned on the upper substrate; an overcoat layer positioned on the light blocking member; and a common electrode positioned on the overcoat layer.

A liquid crystal display according to another exemplary embodiment of the invention includes: a lower substrate including red, green, blue and white sub-pixel areas; a thin film transistor positioned on the lower substrate; red, green and blue color filter layers corresponding to the red, green and blue sub-pixel areas while covering the thin film transistor; and a dummy color filter layer corresponding to the white sub-pixel area. An open portion is respectively defined between the dummy red color filter layer, the dummy green color filter layer and the dummy blue color filter layer.

The dummy red color filter layer, the dummy green color filter layer and the dummy blue color filter layer may be uniformly distributed in the white sub-pixel area.

A thickness of the dummy color filter layer may be the same as a thickness of the red color filter layer, the green color filter layer and the blue color filter layer.

The liquid crystal display may further include a planarizing layer covering the red color filter layer, the green color filter layer, the blue color filter layer and the dummy color filter layer.

The planarizing layer may include a photosensitive organic material.

The liquid crystal display may further include a pixel electrode positioned on the planarizing layer.

The liquid crystal display may further include: an upper substrate facing the lower substrate; a light blocking member positioned on the upper substrate; an overcoat layer positioned on the light blocking member; and a common electrode positioned on the overcoat layer.

According to one or more exemplary embodiment of the invention, the dummy color filter layer is formed in the white sub-pixel area with a structure minimizing a decrease in light transmittance therethrough, thereby reducing the step formed with respect to other sub-pixel areas. Accordingly, a uniform cell gap may be maintained in the pixel area and the luminance may be improved.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION

The invention will be described more fully hereinafter with reference to the accompanying drawings, in which exemplary embodiments of the invention are shown. However, it is to be understood that the invention is not limited to the disclosed embodiments, but, on the contrary, is intended to cover various modifications. As those skilled in the art would realize, the described embodiments may be modified in various different ways, all without departing from the spirit or scope of the invention.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. Like reference numerals designate like elements throughout the specification. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In a liquid crystal panel of a liquid crystal display device, a unit pixel or a pixel area including four sub-pixels has been developed to increase luminance of an image displayed by the liquid crystal display device. That is, a white (W) color filter is further provided in addition to the color filters such as red (R), green (G) and blue (B), thereby forming a four-color pixel method that increases the luminance of white (W) color.

In forming the liquid crystal panel with the unit pixel or pixel area including four sub-pixels described above, the white (W) color filter undesirably adds an additional process and manufacturing cost such that the color filter of white (W) is not actively formed and a white (W) sub-pixel area as an empty space is filled with an overcoat layer. Where the space for the white (W) sub-pixel area is filled with the overcoat layer, as the planar area of the liquid crystal panel is increased, the white (W) sub-pixel area is increased such that a step of the overcoat layer is generated between the white (W) sub-pixel area and the sub-pixel area of the other colors. Accordingly, the overcoat on the white (W) sub-pixel area and on the sub-pixel area of the other colors changes a cross-sectional thickness of a liquid crystal layer of the liquid crystal panel for each respective region by the step, due to a difference of a supporting force of an underlying layer, that is, the color filter, thereby generating an undesirable difference in light efficiency between regions.

Hereinafter, the invention will be described in detail with reference to the accompanying drawings.

Figure 1:
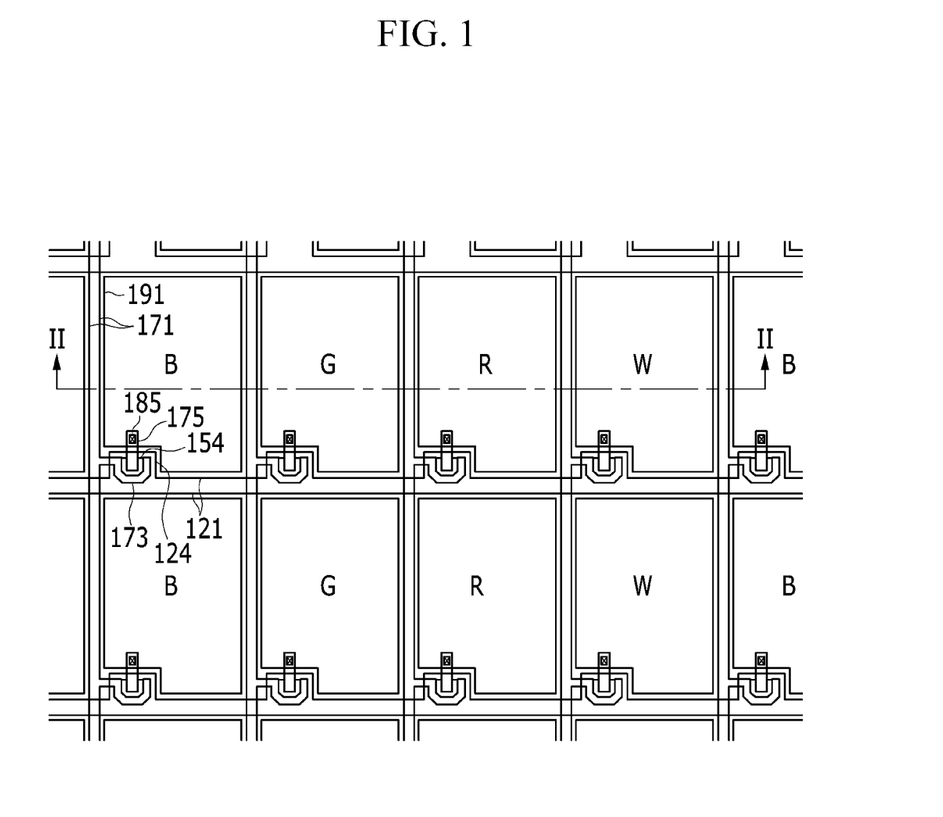
FIG. 1 is a top plan view of an exemplary embodiment of a liquid crystal display according to the invention.
Figure 2:
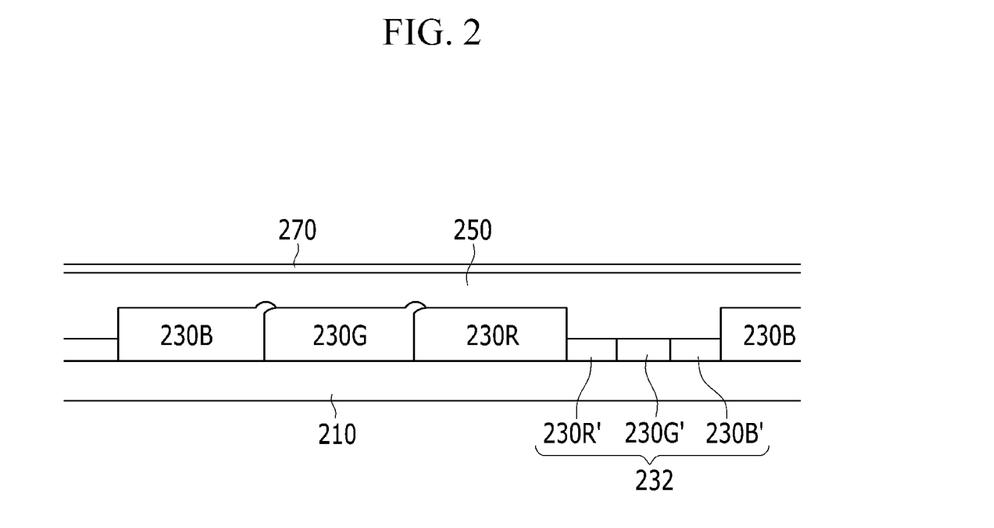
FIG. 2 is a cross-sectional view of an exemplary embodiment of an upper panel of the liquid crystal display of FIG. 1 taken along line II-II according to the invention.

FIG. 1 is a top plan view of an exemplary embodiment of a liquid crystal display according to the invention. FIG. 2 is a cross-sectional view of an exemplary embodiment of an upper panel of the liquid crystal display of FIG. 1 taken along line II-II according to the invention.

Referring to FIG. 1, in a lower panel of the liquid crystal display, a gate line 121 mainly elongated extending in a transverse direction is disposed on a substrate. The gate line 121 transmits a gate signal, and includes a plurality of gate electrodes 124 protruding therefrom. A gate insulating layer including an insulating material such as silicon nitride or silicon oxide is disposed on the gate line 121. A source electrode 173 extended from a data line 171, a drain electrode 175 and a protrusion 154 of the semiconductor layer are disposed on the gate insulating layer and form a thin film transistor ("TFT"). A portion of the protrusion 154 is exposed between the source electrode 173 and the drain electrode 175. A passivation layer is disposed on the data line 171, the drain electrode 175 and the exposed protrusion 154 of the semiconductor layer. A pixel electrode 191 is positioned on the passivation layer, and the pixel electrode 191 and the drain electrode 175 are physically and/or electrically connected to each other through a contact hole 185 defined in the passivation layer.

Next, an upper panel of the liquid crystal display will be described.

Referring to FIG. 1 and FIG. 2, in an upper panel 200 of the liquid crystal display, a red color filter layer 230R, a green color filter layer 230G, and a blue color filter layer 230B are positioned on an insulation substrate 210 including transparent glass or plastic. The red color filter layer 230R, green color filter layer 230G and blue color filter 230B layer may collectively form a color filter layer. The red color filter layer 230R, green color filter layer 230G and blue color filter 230B layer are respectively positioned corresponding to a red sub-pixel area (R), a green sub-pixel area (G) and a blue sub-pixel area (B). Here, sub-pixel areas R, G and B respectively including the color filter layers 230R, 230G and 230B of red, green and blue form one pixel (which may otherwise be referred to as a unit pixel, pixel area or pixel region) thereby displaying a color.

In the illustrated exemplary embodiment, a dummy color filter layer 232 is disposed at a portion corresponding to a white sub-pixel area (W). The dummy color filter layer 232 is in a same layer of the panel as the color filter layers 230R, 230G and 230B. The dummy color filter layer 232 includes a dummy red color filter layer 230R', a dummy green color filter layer 230G' and a dummy blue color filter layer 230B'. The dummy red color filter layer 230R', dummy green color filter layer 230G' and dummy blue color filter layer 230B' along with the red color filter layer 230R, green color filter layer 230G and blue color filter 230B layer may collectively form a color filter layer. An overcoat layer 250 covering the color filter layers 230R, 230G, and 230B of red, green, and blue and the dummy color filter layer 232 is disposed on the insulation substrate 210. In the illustrated exemplary embodiment, the overcoat layer 250 may include an inorganic insulating material such as silicon oxide or silicon nitride. In the illustrated exemplary embodiment, the overcoat layer 250 is positioned in the upper panel such that providing an overcoat layer of a photosensitive organic material is avoided and a process to define a contact hole in such layer is omitted.

In the illustrated exemplary embodiment, a cross-sectional thickness of the dummy color filter layer 232 is less than a cross-sectional thickness of the color filter layers 230R, 230G and 230B. Accordingly, as shown in FIG. 2, a step is formed by the dummy color filter layer 232 along with the neighboring red color filter layer 230R and blue color filter layer 230B. Since the step is formed by the dummy color filter layer 232 and the color filter layers 230R, 230G and 230B, the overcoat layer 250 is relatively thick at the portion corresponding to the dummy color filter layer 232. That is, a cross-sectional thickness of the overcoat layer 250 at the dummy color filter layer 232 is larger than a cross-sectional thickness of a remaining portion of the overcoat layer 250.

Without the dummy color filter layer 232, a space is defined between the insulation substrate 210 and an upper surface of the color filter layers 230R, 230G and 230B, in the white sub-pixel area (W). Where the dummy filter layer 232 is disposed on the insulation substrate 210 in the white sub-pixel area (W), the space is reduced. Accordingly, the reduced space in the white sub-pixel area (W) that is filled with the overcoat layer 250 reduces a step of the overcoat layer 250 along with the other sub-pixel areas R, G and B thereby maintaining the same cell gap for each pixel region of the panel. Also, white color (W) may be realized in the white sub-pixel area (W) without the additional white (W) color filter layer such that the process and the manufacturing cost of a display device including the upper panel may be reduced.

In the illustrated exemplary embodiment, a cross-sectional thickness of the dummy color filter layer 232 is in a range from about 0.2 µm to about 2 µm (about 2,000 angstroms (Å) to about 20,000 Å). As a result of testing an overcoat layer having excellent flatness, a minimum step of a minimum degree of 0.2 µm. When the step is less than 0.2 µm, such an effect of excellent flatness may not be obtained. Also, as the cross-sectional thickness of the dummy color filter layer 232 is increased, the flatness effect to the overcoat layer becomes better, but the increase of the cross-sectional thickness of the dummy color filter layer 232 decreases light transmittance therethrough such that the increase of the cross-sectional thickness of the dummy color filter layer 232 is minimized. In one exemplary embodiment, for example, when considering a step of the overcoat layer that is actually produced is 10,000 Å (1 µm), the cross-sectional thickness of the dummy color filter layer 232 does not exceed 20,000 Å (2 µm) which is double the step. In general, for planarization, the cross-sectional thickness of the layer having the planarization function corresponds to two times the degree of the generated step.

A common electrode 270 is disposed on the overcoat layer 250.

In the illustrated exemplary embodiment, a pixel structure of a stripe shape in which same color sub-pixel areas are arranged according to a pixel column is described, however, the invention is not limited thereto. Alternatively, each adjacent pixel row and each pixel column may include a sub-pixel area of two colors among the sub-pixel areas of four colors, and multiple variations may be provided.

Also, in the illustrated exemplary embodiment, the color filter layers neighboring each other among the color filter layers 230R, 230G and 230B of red, green and blue may overlap each other in a boundary region where they meet each other. Although not shown, a light blocking member may be disposed between the substrate 210 and the neighboring color filter layers 230R, 230G and 230B to correspond to the boundary region where the color filter layers 230R, 230G and 230B meet each other.

Figure 3:
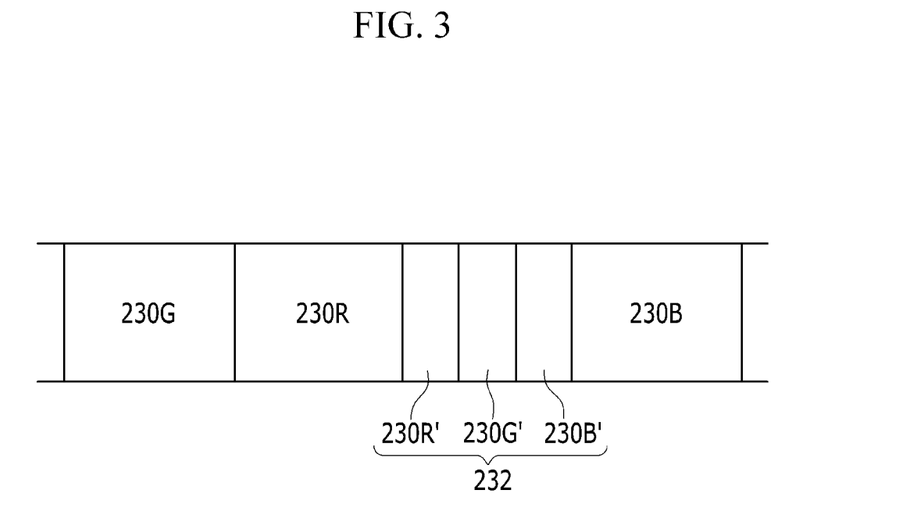
FIG. 3 is a top plan view schematically showing an exemplary embodiment of a color filter layer in the upper panel of FIG. 2 according to the invention.

FIG. 3 is a top plan view schematically showing an exemplary embodiment of a color filter layer in the upper panel of FIG. 2 according to the invention.

Referring to FIG. 3, the dummy red color filter layer 230R', the dummy green color filter layer 230G' and the dummy blue color filter layer 230B' included in the dummy color filter layer 232 may be elongated to extend parallel to each other in a direction substantially perpendicular to the direction in which the gate line 121 extends. The planar areas of the dummy red color filter layer 230R', the dummy green color filter layer 230G' and the dummy blue color filter layer 230B' may be the same, but the invention is not limited thereto or thereby.

Figure 4:
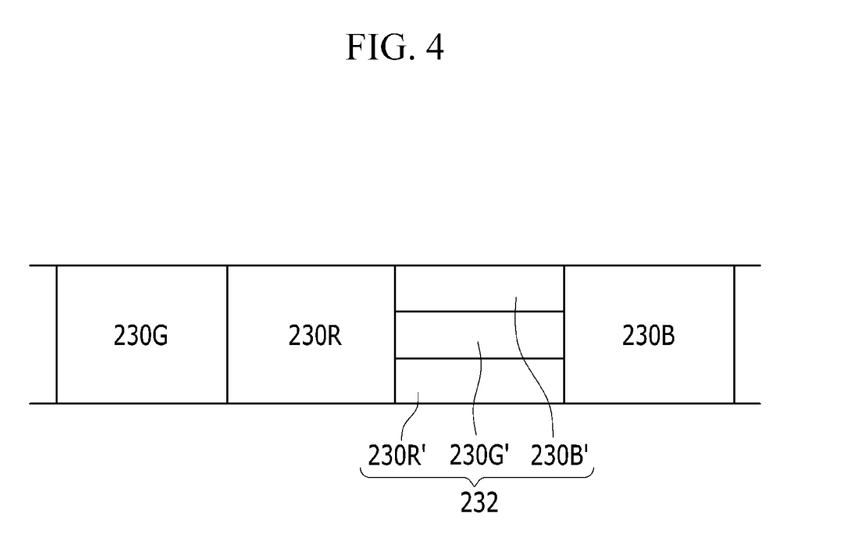
FIG. 4 is a top plan view schematically showing another exemplary embodiment of a color filter layer in the upper panel of FIG. 2 according to the invention.

FIG. 4 is a top plan view schematically showing another exemplary embodiment of a color filter layer in the upper panel of FIG. 2 according to the invention.

The exemplary embodiment of FIG. 4 is substantially the same as the exemplary embodiment described in FIG. 3, however, the dummy red color filter layer 230R', the dummy green color filter layer 230G' and the dummy blue color filter layer 230B' included in the dummy color filter layer 232 may be elongated to extend parallel to each other in the same direction in which the gate line 121 is extended.

As described in FIG. 3 and FIG. 4, in the structure of the dummy color filter layer 232, if the dummy red color filter layer 230R', the dummy green color filter layer 230G' and the dummy blue color filter layer 230B' are disposed while having the same elements within the white sub-pixel area (W), several variations may be provided. Also, since the cross-sectional thickness of the dummy color filter layer 232 is smaller than the cross-sectional thickness of the color filter layers 230R, 230G and 230B, decreases in light transmittance through the dummy color filter layer 232 is thereby minimized.

Figure 5:
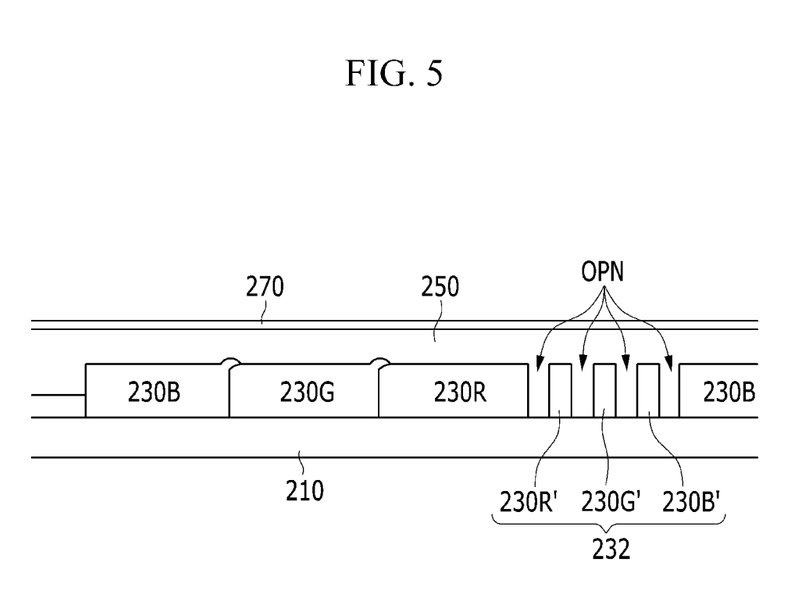
FIG. 5 is a cross-sectional view of another exemplary embodiment of an upper panel of the liquid crystal display of FIG. 1 taken along line II-II according to the invention.

FIG. 5 is a cross-sectional view of another exemplary embodiment of an upper panel of the liquid crystal display of FIG. 1 taken along line II-II according to the invention.

The exemplary embodiment of FIG. 5 is substantially the same as the exemplary embodiment described in FIG. 1 and FIG. 2. Next, only differences will be described.

Referring to FIG. 5, in the upper panel, the dummy color filter layer 232 disposed in the portion corresponding to the white sub-pixel area (W) has substantially the same cross-sectional thickness as the color filter layers 230R, 230G and 230B of red, green and blue.

In the illustrated exemplary embodiment, an open portion OPN is defined between the dummy red color filter layer 230R', the dummy green color filter layer 230G' and the dummy blue color filter layer 230B' included in the dummy color filter layer 232, respectively. The reference numeral OPN in FIG. 5 is shown to collectively indicate the plurality individual open portions between the dummy red color filter layer 230R', the dummy green color filter layer 230G' and the dummy blue color filter layer 230B' included in the dummy color filter layer 232. However, it will be understood that OPN may also be used to indicate one individual open portion between the dummy red color filter layer 230R', the dummy green color filter layer 230G' and the dummy blue color filter layer 230B' included in the dummy color filter layer 232. The open portion OPN may be filled with the overcoat layer 250 covering the color filter layers 230R, 230G and 230B of red, green and blue and the dummy color filter layer 232. An interval between the dummy red color filter layer 230R', the dummy green color filter layer 230G' and the dummy blue color filter layer 230B' may be substantially the same. Accordingly, in the illustrated exemplary embodiment, the dummy red color filter layer 230R', the dummy green color filter layer 230G' and the dummy blue color filter layer 230B' are uniformly distributed in the white sub-pixel area (W), thereby minimizing the decrease of the light transmittance by the white sub-pixel area (W).

In the illustrated exemplary embodiment, the interval between the dummy red color filter layer 230R', the dummy green color filter layer 230G' and the dummy blue color filter layer 230B' may be less than about 10 µm. As a test result, when the interval between the color filter layers 230R, 230G and 230B is 10 µm, the flatness is about 85%. Where the interval between the dummy red color filter layer 230R', the dummy green color filter layer 230G' and the dummy blue color filter layer 230B' is less than 10 μm, the flatness may be more than 85% at a minimum by using the dummy color filter layer 232 according to one or more exemplary embodiment of the invention.

The described contents in FIG. 1 and FIG. 2 may be applied to the illustrated exemplary embodiment of FIG. 5.

Figure 6:
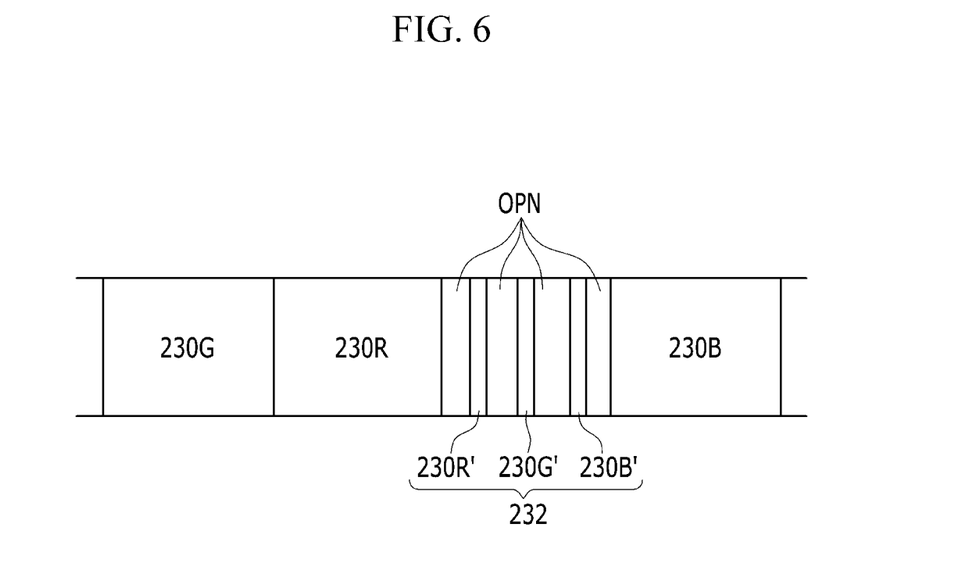
FIG. 6 is a top plan view schematically showing an exemplary embodiment of a color filter layer in the upper panel of FIG. 5 according to the invention.

FIG. 6 is a top plan view schematically showing an exemplary embodiment of a color filter layer in the upper panel of FIG. 5 according to the invention.

Referring to FIG. 6, the dummy red color filter layer 230R', the dummy green color filter layer 230G' and the dummy blue color filter layer 230B' included in the dummy color filter layer 232 may be elongated to extend parallel to each other in a direction substantially perpendicular to the direction in which the gate line 121 extends. Also, the open portion OPN defined between the dummy color filter layers 230R', 230G' and 230B' is elongated to extend in the direction substantially perpendicular to the direction in which the gate line 121 extends. The planar areas of the dummy red color filter layer 230R', the dummy green color filter layer 230G' and the dummy blue color filter layer 230B' may be equal to each other.

Figure 7:
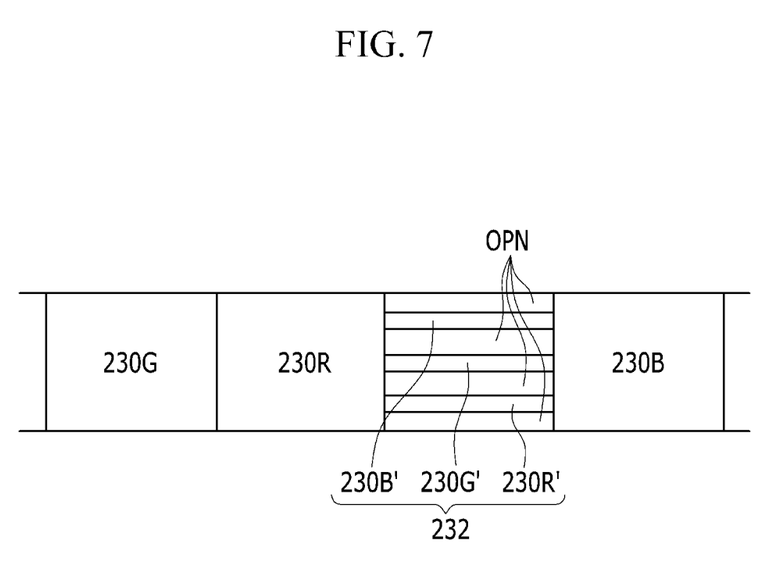
FIG. 7 is a top plan view schematically showing another exemplary embodiment of a color filter layer in the upper panel of FIG. 5 according to the invention.

FIG. 7 is a top plan view schematically showing another exemplary embodiment of a color filter layer in the upper panel of FIG. 5 according to the invention.

The exemplary embodiment of FIG. 7 is substantially the same as the exemplary embodiment described in FIG. 6, however, the dummy red color filter layer 230R', the dummy green color filter layer 230G' and the dummy blue color filter layer 230B' included in the dummy color filter layer 232 may be elongated to extend parallel to each other in the same direction in which the gate line 121 extends.

Figure 8:
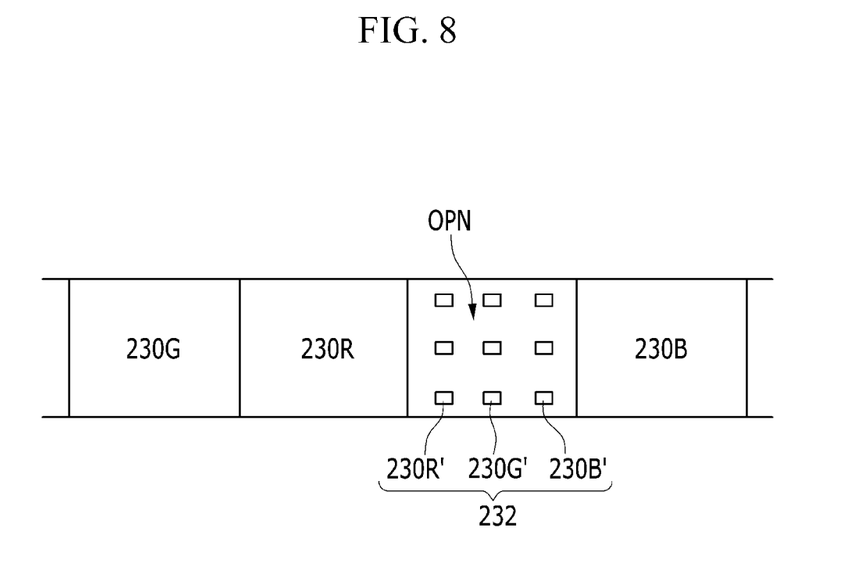
FIG. 8 is a top plan view schematically showing still another exemplary embodiment of a color filter layer in the upper panel of FIG. 5 according to the invention.

FIG. 8 is a top plan view schematically showing still another exemplary embodiment of a color filter layer in the upper panel of FIG. 5 according to the invention.

The exemplary embodiment of FIG. 8 is substantially the same as the exemplary embodiment described in FIG. 6, but the dummy red color filter layer 230R', the dummy green color filter layer 230G' and the dummy blue color filter layer 230B' included in the dummy color filter layer 232 are distributed each having a discrete shape such as a dot shape. The dummy red color filter layer 230R', the dummy green color filter layer 230G' and the dummy blue color filter layer 230B' are respective defined with a plurality of dots. In the white sub-pixel area (W), the dot arrangement structure according to the color may be variously changed, however, the dots being regularly arranged within the white sub-pixel area (W) increases the flatness and minimizes the decrease in light transmittance. The open portion OPN is defined between the dummy color filter layers 230R', 230G' and 230' with the dot shape and the neighboring color filter layer.

As described in FIG. 6 to FIG. 8, in the structure of the dummy color filter layer 232, if the dummy red color filter layer 230R', the dummy green color filter layer 230G' and the dummy blue color filter layer 230B' are disposed while having the same elements within the white sub-pixel area (W), several variations may be provided. Also, since the cross-sectional thickness of the dummy color filter layer 232 is smaller than the thickness of the color filter layers 230R, 230G and 230B, the decrease of the light transmittance is minimized.

Next, an exemplary embodiment in which the color filter layers 230R, 230G and 230B and the dummy color filter layer 232 are disposed in the lower panel will be described.

Figure 9:
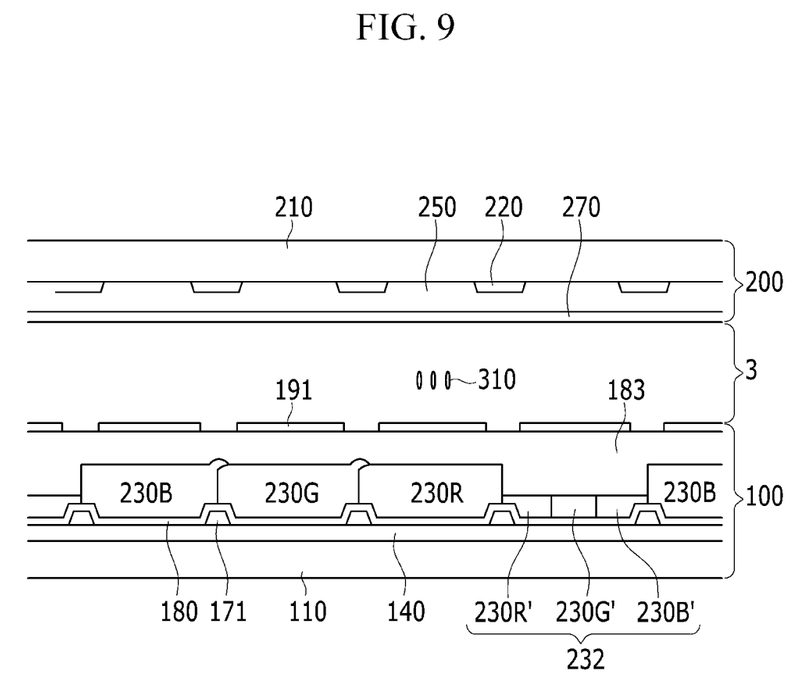
FIG. 9 is a cross-sectional view of an exemplary embodiment of the liquid crystal display of FIG. 1 taken along line II-II, including a lower panel, an upper panel and a liquid crystal layer, according to the invention.

FIG. 9 is a cross-sectional view of an exemplary embodiment of the liquid crystal display of FIG. 1 taken along line II-II, including a lower panel, an upper panel and a liquid crystal layer according to the invention.

Referring to FIG. 1 and FIG. 9, an exemplary embodiment of a liquid crystal display according to the invention includes a lower panel 100 and an upper panel 200, and a liquid crystal layer 3 interposed between two display panels 100 and 200.

Firstly, the lower panel 100 will be described.

A gate line 121 including a gate electrode 124 and elongated to extend mainly in the transverse direction is disposed on a lower insulation substrate 110. A gate insulating layer 140 covering the gate electrode 124 and the gate line 121 is disposed on the lower insulation substrate 110. A source electrode 173 a drain electrode 175 and a protrusion 154 of the semiconductor layer are disposed on the gate insulating layer 140 and form the TFT. A portion of the protrusion 154 is exposed between the source electrode 173 and the drain electrode 175. Also, a data line 171 connected to the source electrode 173 is elongated to intersect the gate line 121.

A passivation layer 180 is disposed on the data line 171, the drain electrode 175 and the exposed projection 154 of the semiconductor layer. The passivation layer 180 may include the inorganic insulating material such as silicon oxide or silicon nitride. In an alternative exemplary embodiment, the passivation layer 180 may be omitted.

A red color filter layer 230R, a green color filter layer 230G and a blue color filter layer 230B are positioned on the passivation layer 180. The red color filter layer 230R, green color filter layer 230G and blue color filter layer 230B are respectively positioned corresponding to a red sub-pixel area (R), a green sub-pixel area (G), a blue sub-pixel area (B). Here, the sub-pixel areas R, G and B respectively including the color filter layers 230R, 230G and 230B of red, green and blue form one pixel, thereby displaying a color.

In the illustrated exemplary embodiment, a dummy color filter layer 232 is disposed at a portion corresponding to a white sub-pixel area (W). The dummy color filter layer 232 includes a dummy red color filter layer 230R', a dummy green color filter layer 230G' and a dummy blue color filter layer 230B'. A planarizing layer 183 is disposed to cover the color filter layers 230R, 230G and 230B of red, green and blue and the dummy color filter layer 232. In the illustrated exemplary embodiment, the planarizing layer 183 includes a photosensitive organic material. In the illustrated exemplary embodiment, the planarizing layer 183 is positioned in the lower panel 100 which includes the TFT therein such that it is advantageous for the planarizing layer 183 to have photosensitivity in a manufacturing process where the contact hole 185 is subsequently defined n the planarizing layer 183.

In the illustrated exemplary embodiment, the cross-sectional thickness of the dummy color filter layer 232 is smaller than the cross-sectional thickness of the color filter layers 230R, 230G and 230B. Accordingly, as shown in FIG. 9, the dummy color filter layer 232 forms a step with the neighboring red color filter layer 230R and blue color filter layer 230B. The dummy color filter layer 232 and the color filter layers 230R, 230G and 230B form the step such that the cross-sectional thickness of the planarizing layer 183 is greater at the portion corresponding to the dummy color filter layer 232 than at a remaining portion of the planarizing layer 183.

Without the dummy color filter layer 232, a space is defined between the insulation substrate 210 and an upper surface of the color filter layers 230R, 230G and 230B, in the white sub-pixel area (W). Where the dummy filter layer 232 is disposed on the insulation substrate 210 in the white sub-pixel area (W), the space is reduced. Accordingly, the reduced space in the white sub-pixel area (W) that is filled with the planarizing layer 183 reduces the step of the planarizing layer 183 along with the other sub-pixel area, thereby maintaining the same cell gap for each pixel region. Also, white color (W) may be realized in the white sub-pixel area (W) without the additional white (W) color filter layer such that the process and the manufacturing cost of a display device including the lower panel 100 may be reduced.

In the illustrated exemplary embodiment, the cross-sectional thickness of the dummy color filter layer 232 is in a range from about 0.2 μm to about 2 μm.

Like the previous illustrated exemplary embodiments, when the color filter layers 230R, 230G and 230B are disposed in the lower panel 100 including the various layers such as the TFT, the flatness may be increased by using the dummy color filter layer 232.

A pixel electrode 191 is positioned on the planarizing layer 183. The pixel electrode 191 and the drain electrode 175 are connected through the contact hole 185 defined in the planarizing layer 183 and the passivation layer 180.

Next, the upper panel 200 will be described.

A light blocking member 220 is disposed on an upper insulation substrate 210 including transparent glass or plastic. The light blocking member 220 may correspond to the boundary region where adjacent color filter layers of the lower panel 100 meet each other. The light blocking member 220 prevents light leakage generated between the pixel electrodes 191. Opening regions are defined in the light blocking member 220 and face the pixel electrodes 191.

In the illustrated exemplary embodiment, the light blocking member 220 is disposed in the upper panel 200, however, the light blocking member 200 may be disposed in the lower panel 100.

An overcoat layer 250 is disposed on the light blocking member 220. The overcoat layer 250 may include the insulating material, and may provide a flat surface. In an alternative exemplary embodiment, the overcoat layer 250 may be omitted.

A common electrode 270 is disposed on the overcoat layer 250. The common electrode 270 includes the transparent conductor such as indium tin oxide ("ITO") and indium zinc oxide ("IZO"), and receives a common voltage (Vcom).

Liquid crystal molecules 310 between the lower and upper display panels 100 and 200 have negative dielectric anisotropy, and may be oriented such that the major axes thereof are substantially perpendicular to the surfaces of the two display panels 100 and 200 when no electric field is applied.

The pixel electrode 191 and the common electrode 270 form a liquid crystal capacitor along with the liquid crystal layer 3 therebetween to maintain applied voltages after the TFT is turned off.

The pixel electrode 191 may form a storage capacitor along with a storage electrode line (not shown) to enhance the voltage storing capacity of the liquid crystal capacitor.

Further, the described contents in FIG. 3 and FIG. 4 may be applied to the liquid crystal display according to the illustrated exemplary embodiment of FIG. 9.

Figure 10:
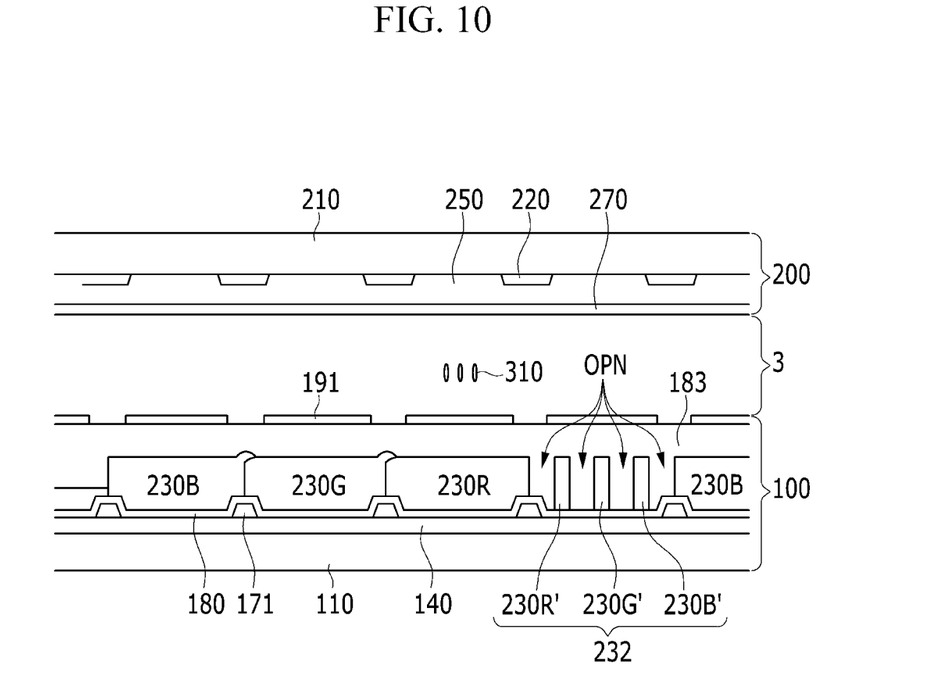
FIG. 10 is a cross-sectional view of another exemplary embodiment of the liquid crystal display of FIG. 1 taken along line II-II, including a lower panel, an upper panel and a liquid crystal layer, according to the invention.

FIG. 10 is a cross-sectional view of another exemplary embodiment of the liquid crystal display of FIG. 1 taken along line II-II, including a lower panel, an upper panel and a liquid crystal layer according to the invention.

The exemplary embodiment of FIG. 10 is substantially the same as the exemplary embodiment of FIG. 9. Accordingly, the differences will be described.

Referring to FIG. 1 and FIG. 10, in the lower panel 100, the color filter layers 230R, 230G and 230B and the dummy color filter layer 232 are disposed. The dummy color filter layer 232 disposed at the portion corresponding to the white sub-pixel area (W) has substantially the same cross-sectional thickness as the color filter layers 230R, 230G and 230B of red, green and blue.

In the illustrated exemplary embodiment, the open portion OPN is defined between the dummy red color filter layer 230R', the dummy green color filter layer 230G' and the dummy blue color filter layer 230B' included in the dummy color filter layer 232, and the neighboring color filter layer. The open portion OPN may be filled by the planarizing layer 183 covering the color filter layers 230R, 230G and 230B of red, green and blue and the dummy color filter layer 232. The interval between the dummy red color filter layer 230R', the dummy green color filter layer 230G' and the dummy blue color filter layer 230B' is substantially the same. Accordingly, in the illustrated exemplary embodiment, the dummy red color filter layer 230R', the dummy green color filter layer 230G' and the dummy blue color filter layer 230B' are uniformly distributed in the white sub-pixel area (W) thereby minimizing the decrease in light transmittance by the white sub-pixel area (W).

In the illustrated exemplary embodiment, the interval between the dummy red color filter layer 230R', the dummy green color filter layer 230G' and the dummy blue color filter layer 230B' may be less than about 10 μm.

The contents described in FIG. 9 may be applied to the illustrated exemplary embodiment of FIG. 10.

Also, the contents described in FIG. 6 to FIG. 8 may be applied to the liquid crystal display according to the illustrated exemplary embodiment.

Hereinafter, an exemplary embodiment of a method of manufacturing a display panel including a color filter layer according to the invention will be described.

Again referring to FIG. 2, a color filter material of red is coated on an insulation substrate 210 and is patterned such as by a photo-process using a mask to form the red color filter layer 230R and the dummy red color filter layer 230R' in the red sub-pixel area (R) and a portion of the white sub-pixel area (W), respectively. When forming the dummy red color filter layer 230R' in the white sub-pixel area (W), a half-tone mask or a slit mask may be used.

A color filter material of green is coated on the insulation substrate 210 including the red color filter layer 230R and the dummy red color filter layer 230R' and is patterned by the photo-process using a mask to form the green color filter layer 230G and the dummy green color filter layer 230G' in the green sub-pixel area (G) and a portion of the white sub-pixel area (W), respectively. The green color filter layer 230G and the dummy green color filter layer 230G' are respectively formed to be relatively close to and/or contacting the red color filter layer 230R and the dummy red color filter layer 230R'. The green color filter layer 230G and the red color filter layer 230R may overlap each other, but the invention is not limited thereto.

Through the same method, the blue color filter layer 230B and the dummy blue color filter layer 230B' are formed to be relatively close to and/or contacting the green color filter layer 230G and the dummy green color filter layer 230G'.

Next, another exemplary embodiment of a method of manufacturing a display panel including a color filter layer according to the invention will be described.

Again referring to FIG. 5, a color filter material of red is coated on an insulation substrate 210 and is patterned such as by a photo-process using a mask to form the red color filter layer 230R and the dummy red color filter layer 230R' in the red sub-pixel area (R) and a portion of the white sub-pixel area (W), respectively. The red color filter layer 230R and the dummy red color filter layer 230R' are separated by the open portion OPN.

A color filter material of green is coated on the insulation substrate 210 including the red color filter layer 230R and the dummy red color filter layer 230R' and is patterned by the photo-process using a mask to form the green color filter layer 230G and the dummy green color filter layer 230G' in the green sub-pixel area (G) and a portion of the white sub-pixel area (W), respectively. The green color filter layer 230G may be formed to overlap the red color filter layer 230R, and the dummy green color filter layer 230G' may be formed to be separated from the dummy red color filter layer 230R' by the open portion OPN.

By the same method, the blue color filter layer 230B is formed to overlap the green color filter layer 230G and the dummy blue color filter layer 230B' and formed to be separated from the dummy green color filter layer 230G' by the open portion OPN.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display panel comprising:
a substrate comprising red, green, blue and white sub-pixel areas;
red, green and blue color filter layers respectively in the red, green and blue sub-pixel areas; and
a dummy color filter layer disposed in a same layer as the red, green and blue color filter layers and corresponding to the white sub-pixel area,
wherein
the dummy color filter layer is adjacent to at least one of the red color filter layer, the green color filter layer and the blue color filter layer, and
a cross-sectional thickness of the dummy color filter layer defined between an uppermost surface thereof and the substrate is less than a cross-sectional thickness of each of the red color filter layer, the green color filter layer and the blue color filter layer respectively defined between uppermost surfaces thereof and the substrate.

2. The display panel of claim 1, wherein
the dummy color filter layer comprises a dummy red color filter layer, a dummy green color filter layer and a dummy blue color filter layer, and
planar areas of the dummy red color filter layer, the dummy green color filter layer and the dummy blue color filter layer are the same in the white sub-pixel area.

3. The display panel of claim 2, further comprising
an overcoat layer covering the red color filter layer, the green color filter layer, the blue color filter layer and the dummy color filter layer.

4. The display panel of claim 3, wherein
adjacent color filter layers among the red color filter layer, the green color filter layer and the blue color filter layer overlap each other.

5. The display panel of claim 1, wherein
the cross-sectional thickness of the dummy color filter layer corresponding to the white sub-pixel area is from about 0.2 micrometer to about 2 micrometers.

6. The display panel of claim 1, further comprising
an overcoat layer covering the red color filter layer, the green color filter layer, the blue color filter layer and the dummy color filter layer,
wherein the overcoat layer comprises an inorganic insulating layer.

7. A liquid crystal display comprising:
a lower substrate comprising red, green, blue and white sub-pixel areas;
a thin film transistor on the lower substrate;
red, green and blue color filter layers covering the thin film transistor and respectively corresponding to the red, green and blue sub-pixel areas, and
a dummy color filter layer in a same layer as the red, green and blue color filter layers and corresponding to the white sub-pixel area,
wherein
the dummy color filter layer is adjacent to at least one of the red color filter layer, the green color filter layer and the blue color filter layer, and
a cross-sectional thickness of the dummy color filter layer defined between an uppermost surface thereof and the substrate is less than a cross-sectional thickness of each of the red color filter layer, the green color filter layer and the blue color filter layer respectively defined between uppermost surfaces thereof and the substrate.

8. The liquid crystal display of claim 7, wherein
the dummy color filter layer comprises a dummy red color filter layer, a dummy green color filter layer and a dummy blue color filter layer, and
planar areas of the dummy red color filter layer, the dummy green color filter layer and the dummy blue color filter layer are the same in the white sub-pixel area.

9. The liquid crystal display of claim 8, further comprising
a planarizing layer covering the red color filter layer, the green color filter layer, the blue color filter layer and the dummy color filter layer.

10. The liquid crystal display of claim 9, wherein
the planarizing layer comprises a photosensitive organic material.

11. The liquid crystal display of claim 10, wherein
a cross-sectional thickness of the planarizing layer corresponding to the dummy color filter layer is greater than a cross-sectional thickness of the planarizing layer corresponding to the red color filter layer, the green color filter layer and the blue color filter layer.

12. The liquid crystal display of claim 9, further comprising
a pixel electrode on the planarizing layer.

13. The liquid crystal display of claim 12, further comprising:
an upper substrate facing the lower substrate;
a light blocking member on the upper substrate;
an overcoat layer on the light blocking member; and
a common electrode on the overcoat layer.

14. A liquid crystal display comprising:
a lower substrate comprising red, green, blue and white sub-pixel areas;
a thin film transistor on the lower substrate;
red, green and blue color filter layers covering the thin film transistor and corresponding to the red, green and blue sub-pixel areas;

a dummy color filter layer in a same layer as the red, green and blue color filter layers and corresponding to the white sub-pixel area, wherein an open portion is respectively defined between a dummy red color filter layer, a dummy green color filter layer and a dummy blue color filter layer of the dummy color filter layer, in the white sub-pixel area, and the red, green and blue dummy color filter layers of the dummy color filter layer are each provided in plural with a dot shape and distributed in the white pixel area; and a planarizing layer covering the red color filter layer, the green color filter layer, the blue color filter layer and the dummy color filter layer such that an uppermost surface of the planarizing layer at the red, green and blue dummy color filter layers between which is defined the open portion, and an uppermost surface of the planarizing layer at the red, green and blue color filter layers, are at same distances from the substrate.

15. The liquid crystal display of claim 14, wherein the dummy red color filter layer, the dummy green color filter layer and the dummy blue color filter layer are uniformly distributed in the white sub-pixel area.

16. The liquid crystal display of claim 15, wherein a cross-sectional thickness of the dummy color filter layer is the same as a cross-sectional thickness of each of the red color filter layer, the green color filter layer and the blue color filter layer.

17. The liquid crystal display of claim 14, wherein the planarizing layer comprises a photosensitive organic material.

18. The liquid crystal display of claim 14, further comprising a pixel electrode on the planarizing layer.

19. The liquid crystal display of claim 18, further comprising:

an upper substrate facing the lower substrate;
a light blocking member on the upper substrate;
an overcoat layer on the light blocking member; and
a common electrode on the overcoat layer.

* * * * *